United States Patent [19]

Swinford

[11] 3,996,652

[45] Dec. 14, 1976

[54] PIPE POSITIONING TOOL

[76] Inventor: Eugene B. Swinford, 217 Southridge Road, Delray Beach, Fla. 33444

[22] Filed: Jan. 14, 1976

[21] Appl. No.: 649,136

[52] U.S. Cl. .............................. 29/265; 29/200 B; 29/200 P

[51] Int. Cl.² ....................................... B23P 19/04

[58] Field of Search ............ 29/200 B, 200 P, 244, 29/256, 263, 265

[56] References Cited

UNITED STATES PATENTS

| | | | |
|---|---|---|---|
| 3,368,270 | 2/1968 | Babian | 29/265 |
| 3,662,451 | 5/1972 | Wagner | 29/263 |
| 3,774,286 | 11/1973 | Reed | 29/244 |

Primary Examiner—James L. Jones, Jr.
Attorney, Agent, or Firm—Oltman and Flynn

[57] ABSTRACT

The purpose of this tool is to hold a pipe, located in a trench in the ground, against an opening in the sidewall of a manhole while concrete is poured into the trench to encase the pipe. The tool has a screw-threaded central rod for insertion axially into the pipe from inside the manhole through the sidewall opening. A wedge nut is threaded onto the rod for spreading the end of the pipe into tight engagement with the opening in the sidewall of the manhole. Deformable rings on the rod are expanded radially outward into gripping engagement with the inside of the pipe when it is to be pulled over the wedge nut.

7 Claims, 5 Drawing Figures

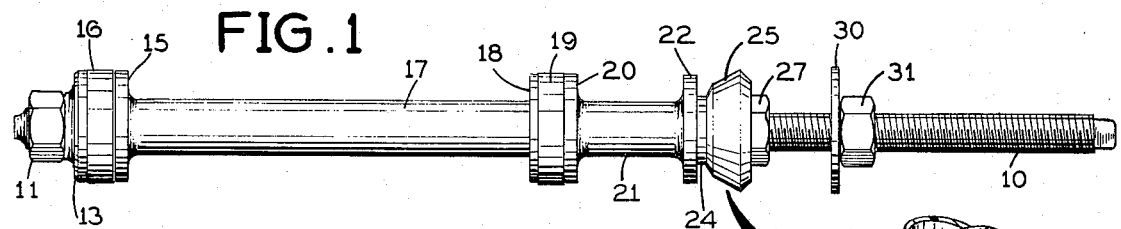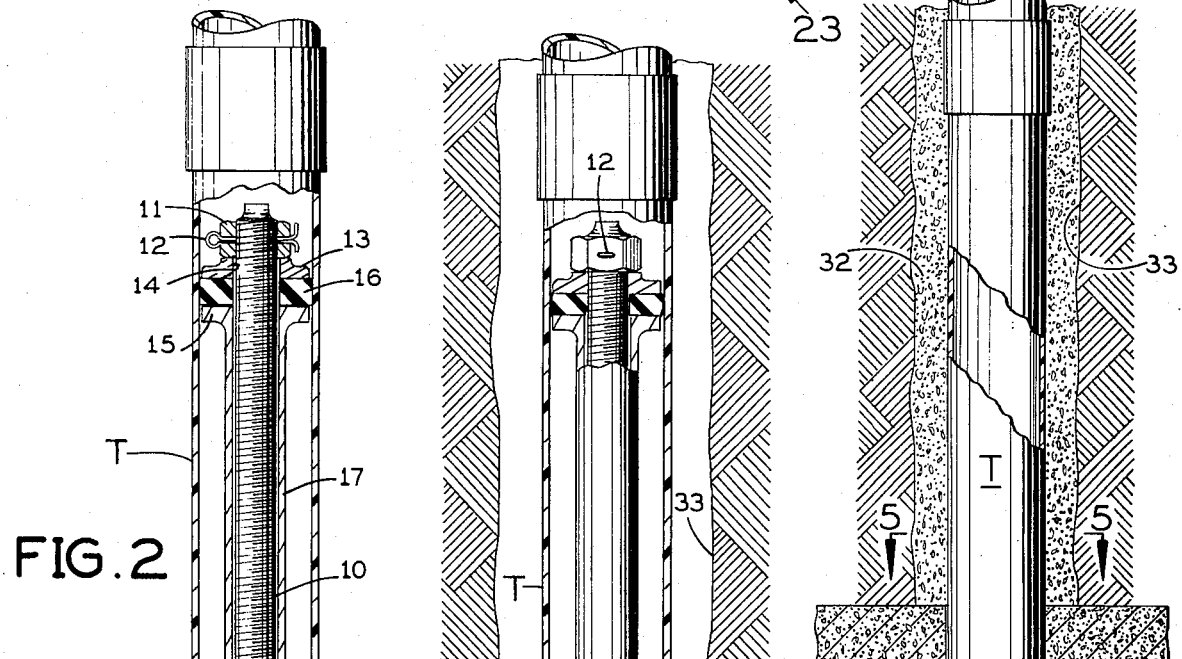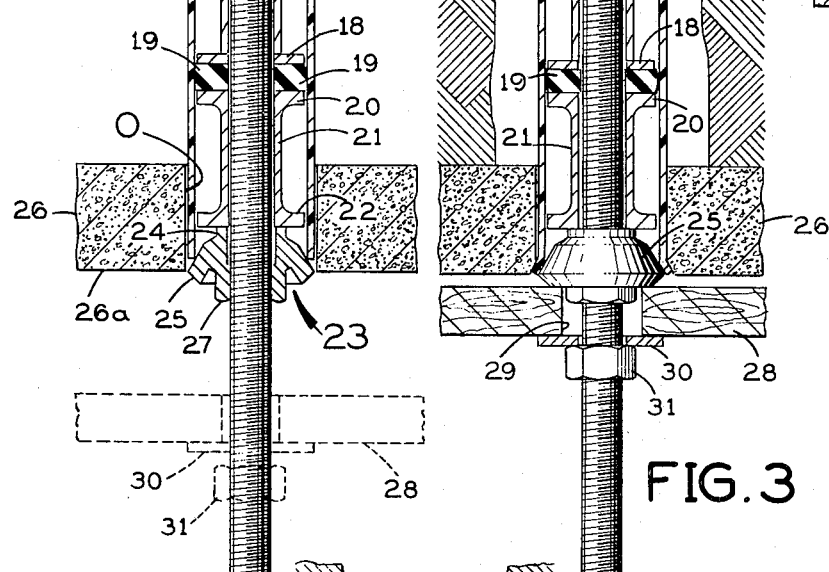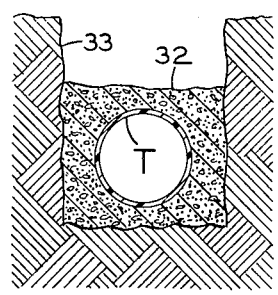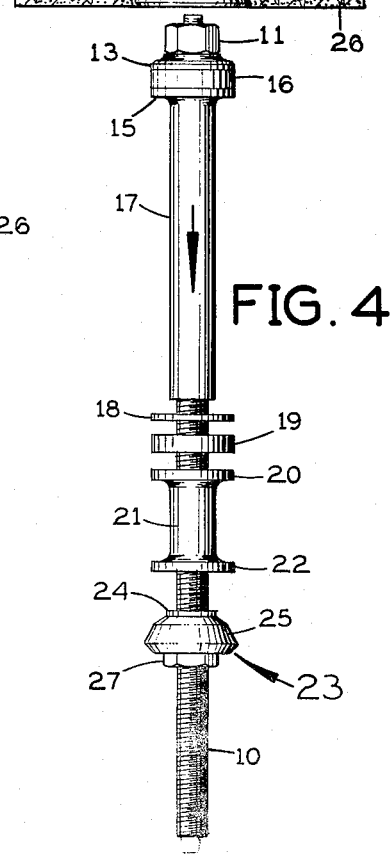

PIPE POSITIONING TOOL

BACKGROUND OF THE INVENTION

Current practice in the installation of underground wiring involves the following steps: digging a trench in the ground; positioning at intervals along the trench a series of metal supports which provide upwardly-facing, generally U-shaped recesses for receiving a pipe; positioning in the trench, resting in the recesses of these supports, one or more plastic pipes through which the wiring will extend longitudinally; and then pouring concrete into the trench to solidify around the pipe and embed it securely in the trench. Typically, such underground pipes may be 2, 4, or 6 inches in diameter. The pipes extend between manholes in the ground which have openings in their side walls in alignment with the pipes. Each pipe should be held tightly against the manhole at the opening when the concrete is poured so that the wet concrete will not get into the end of the pipe and solidify inside the pipe. Prior to the present invention no entirely satisfactory and convenient arrangement has been provided for achieving this. As a consequence, frequently wet concrete has gotten into the end of the pipe and solidified inside the pipe, and has had to be removed later at great effort and expense.

SUMMARY OF THE INVENTION

The present invention is directed to a novel and improved pipe positioning apparatus which effectively solves this problem.

The present invention is a manually operated tool for insertion through the manhole opening longitudinally into the pipe by an operator standing inside the manhole. After such insertion, a wedge nut in the tool is turned to displace axially an elongated, screw-threaded, central rod in the tool. Such axial displacement of the central rod produces radially outward expansion of deformable rings into tight gripping engagement with the inside of the pipe. Continued rotation of the wedge nut causes the end of the pipe to be pulled longitudinally over the wedge nut and wedged out by the latter into tight engagement with the inside of the opening in the side wall of the manhole. A plywood panel, which rests on the manhole floor, is clamped against the outer end of the wedge nut to hold the tool and pipe in this position when the concrete is poured in the trench where the pipe is located.

A principal object of this invention is to provide a novel and improved tool for use with a pipe in a trench in the ground to hold the pipe tightly against a manhole at the end of the trench while the pipe is being encased in concrete in the trench.

Further objects and advantages of this invention will be apparent from the following detailed description of a presently-preferred embodiment thereof, which is shown in the accompanying drawing in which:

FIG. 1 is a longitudinal elevational view of the present tool;

FIG. 2 is a longitudinal sectional view showing this tool inserted through an opening in the side of a manhole into a pipe, located in a trench outside the manhole, which is to be held tightly against the manhole opening;

FIG. 3 is a view similar to FIG. 2 and showing the parts after the pipe has been pulled tight against the manhole;

FIG. 4 is a view taken longitudinally of the pipe and showing the pipe embedded in concrete in the trench and the present tool removed from the pipe; and FIG. 5 is a cross-section taken along the line 5—5 in FIG. 4 and showing the pipe embedded in concrete in the trench outside the manhole.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring to FIGS. 1 and 2, the presently-preferred embodiment of this tool comprises an elongated, straight, externally screw-threaded, central rod or shaft 10 having a nut 11 fixedly secured to its inner end by a cotter pin 12 (FIG. 2) or another suitable fastener. A rigid annular first thrust plate 13 engages this nut. Plate 13 has a central opening 14 which loosely receives the central rod 10 so that there is no screw-threaded connection between them.

A second rigid annular thrust plate 15 is spaced axially from the first-mentioned thrust plate 13 and it loosely receives the central rod 10 in the same fashion. A first deformable ring 16 of rubber or rubber-like material is sandwiched axially between the thrust plates 13 and 15. When it is not compressed axially, the deformable ring 16 passes the central rod 10 loosely, as shown in FIG. 2. In the particular embodiment shown, the second thrust plate 15 is integral with an elongated, rigid spacer sleeve 17, which extends axially outward along the central stem 10 and passes the central stem 10 loosely. However, it is to be understood that this spacer sleeve may be separate from the plate 15, if desired.

The opposite end of sleeve 17 engages a third rigid, annular thrust plate 18, which engages one side of a second ring 19 of rubber or rubber-like, deformable material. A fourth rigid annular thrust plate 20 engages the opposite side of the second deformable ring 19. Both plates 18 and 20 have central openings which loosely pass the central rod 10, and neither of them has a screw-threaded connection with the rod. When the deformable ring 19 is not compressed it passes the central rod 10 loosely.

A second sleeve 21, which also loosely receives the central rod 10, extends outward along the rod away from thrust plate 20. In the embodiment shown, the sleeve 21 is integral with thrust plate 20 but may be separate, if desired. A fifth rigid annular thrust plate 22 is at the outer end of sleeve 21. Plate 22 also is shown as being integral with sleeve 21 but may be separate, if desired. Plate 22 also passes the central rod 10 loosely.

An annular wedging nut 23 is threadedly mounted on the central rod 10 axially outward from the thrust plate 22. This nut has a reduced, annular inner end 24 for abutting engagement with the outer end face of plate 22. Axially outward from this location, the nut presents a frusto-conical outer face 25 which is tapered outward from thrust plate 22 and extends radially outward beyond the latter's outer circumference.

Preferably, the thrust plates 13, 15, 18, 20 and 22 all have substantially the same outside diameter, which is just slightly less than the inside diameter of the pipe T with which this tool is used. The two deformable rings 16 and 19, when uncompressed, have a slightly larger outside diameter than the thrust plates but are still small enough to be slidable into the pipe T.

At the outer end of its tapered outer face 25 (FIG. 2) the wedge nut 23 has an outside diameter slightly larger than the diameter of the opening 0 in the side wall 26 of the manhole to which the end of the pipe T is to be connected. Consequently, when the tool is inserted from inside the manhole through this opening 0 and into the pipe T, this part of the wedge nut will engage the inside face 26a of the manhole sidewall 26 around this opening 0.

At its outer end the wedge nut 23 has a hexagonal segment 27 for engagement by a wrench.

In the use of this tool, the end of the pipe T is received in the opening 0 in the sidewall of the manhole, as shown in FIG. 2, and the tool is inserted endwise into the pipe, as shown in FIG. 2, until the wedge nut 23 engages the inside face 26a of this sidewall.

The wedge nut 23 now is turned in a direction to pull the central rod 10 in a direction axially out of the pipe T. This axial displacement of rod 10 causes the deformable rings 16 and 19 to be squeezed axially. This causes them to expand radially outward into tight gripping engagement with the inside of the pipe T.

Enough axial compression of the deformable rings 16 and 19 occurs that the pipe T is pulled toward the interior of the manhole. The end of the pipe is wedged outwardly by the tapered surface 25 of wedge nut 23 into tight engagement with the cylindrical wall of the opening 0. This action is shown in FIG. 3.

To hold the parts firmly in this position, a rigid plywood panel 28 with an opening 29 is inserted over the outer end of the threaded central rod 10 until it abuts against the wedge nut as shown in FIG. 3, with the panel opening 29 passing the hexagonal outer end segment 27 of the wedge nut 23. This panel extends vertically and rests on the floor of the manhole. Next a flat, annular, rigid washer 30 and a nut 31 are inserted onto the rod 10, and this nut is tightened to hold the panel 28 tightly against the wedge nut 23.

With this arrangement, the present tool closes the adjacent end of the pipe T and wedges it against the wall of the opening 0 in the manhole sidewall, holding it horizontally.

When concrete 32 (FIG. 4) is poured into the trench 33 in the ground around the pipe T there is no possibility that any of it can get into the end of the pipe at the manhole.

After the concrete has set, the nut 31, washer 30 and plywood panel 28 are removed from the tool. Then the wedge nut 23 is turned in a direction to relieve the axial squeezing pressure on the deformable rings 16 and 19, so that now these rings are released from holding engagement with the inside of the pipe T. Consequently, the tool may be pulled out of the pipe as shown in FIG. 4

It is to be understood that in using the tool the rod 10 may be rotated while the wedge nut 23 is held stationary, instead of vice versa. Also, the rod 10 need be screw-threaded only where the wedge nut 23 and the clamping nut 31 engage it, and it may be smooth surfaced for the remainder of its length, if desired. The tapered wedge surface 25 need not be integral with the nut 23 so long as it (the wedge surface) is suitably constructed and arranged to be positioned by that nut.

I claim:

1. A tool for positioning the end of a pipe tightly against a wall at an opening in the wall, said tool comprising:
    an elongated rod for insertion through the opening in the wall longitudinally into the pipe;
    means on said rod selectively operable to expand radially outward into gripping engagement with the inside of the pipe;
    and means operatively associated with the rod to pull the rod and the pipe axially toward the wall, said last-mentioned means including wedge means for engaging the end of the pipe at said opening in the wall to spread said end of the pipe into tight engagement with the wall thereat.

2. A tool according to claim 1, wherein:
    said rod is screw-threaded for at least a portion of its length;
    and said means to pull the rod and pipe is a nut threadedly receiving the rod and shaped and dimensioned to seat against the wall at said opening therein on the opposite side of the wall from the pipe.

3. A tool according to claim 2 wherein said wedge means is integral with said nut and provides a tapered annular surface shaped and dimensioned to enter said end of the pipe upon relative rotation between said nut and said rod.

4. A tool according to claim 2, wherein:
    said means on the rod for gripping engagement with the inside of the pipe is expanded radially outward upon relative rotation between said nut and said rod;
    and said wedge means is connected to said nut and presents a tapered annular surface shaped and dimensioned to enter and spread said end of the pipe in response to said relative rotation between said nut and said rod.

5. A tool for use with an underground pipe extending substantially horizontally outside a manhole and having an end slidably received in an opening in a sidewall of the manhole, said tool comprising:
    an elongated rigid rod which is insertable from inside the manhole through said opening longitudinally into the pipe, said rod being screw-threaded for at least a portion of its extent;
    an annular wedge nut threaded onto said rod and shaped and dimensioned to engage said manhole sidewall at the inside around said opening when the rod is inserted through said opening into the pipe;
    gripping means on said rod longitudinally inward from said wedge nut, said gripping means being slidably insertable with said rod into the pipe and radially expandable into gripping engagement with the inside of the pipe upon relative rotation between the wedge nut and the rod to pull the pipe axially toward the manhole sidewall;
    said wedge nut presenting a tapered surface for wedging engagment with said end of the pipe in the opening to force said end of the pipe tightly against the opening as the pipe is pulled axially in response to said relative rotation between the wedge nut and said rod.

6. A tool according to claim 5, wherein said gripping means comprises:
    a deformable rubber-like ring encircling the rod, said ring have a close sliding fit in said pipe when unstressed;
    and thrust plates respectively engaging the deformable ring on opposite sides thereof longitudinally of the rod, said thrust plates acting between the rod and the wedge nut to squeeze said deformable ring axially between them upon said relative rotation between the wedge nut and the rod to thereby cause said ring to expand radially outward into frictional gripping engagement with the inside of the pipe.

7. A tool according to claim 5, wherein said gripping means comprises:
   first and second deformable rings of rubber-like material on said rod at spaced locations along the latter's length, each of said deformable rings when unstressed having a close sliding fit in said pipe;
   a first rigid thrust plate engaging said first deformable ring at the side thereof toward the inner end of the rod;
   a second rigid thrust plate engaging said first deformable ring at the opposite side thereof toward the wedge nut;
   means for imparting to said first thrust plate the axial displacement of the rod upon said relative rotation between the wedge nut and the rod;
   third and fourth rigid thrust plates engaging said second deformable ring on opposite axial sides thereof;
   a rigid annular sleeve loosely encircling said rod and extending longitudinally between said second and third thrust plates for imparting an axial thrust from one to the other;
   and rigid means outside the rod extending longitudinally between said wedge nut and said fourth thrust plate;
   said first and second thrust plates squeezing said first deformable ring axially between them, and said third and fourth thrust plates squeezing said second deformable ring axially between them, in response to said relative rotation between the wedge nut and the rod, whereby to expand said deformable rings radially outward into frictional gripping engagement with the inside of the pipe.

* * * * *